(12) United States Patent
Jiang et al.

(10) Patent No.: US 11,913,849 B2
(45) Date of Patent: Feb. 27, 2024

(54) MULTI-DEGREE OF FREEDOM FORCE AND TORQUE SENSOR AND ROBOT

(71) Applicants: Shanghai Flexiv Robotics Technology Co,. Ltd., Shanghai (CN); Flexiv Ltd., Grand Cayman (KY)

(72) Inventors: Hao Jiang, Santa Clara, CA (US); Shuhan Li, Santa Clara, CA (US); Shiquan Wang, Santa Clara, CA (US); Ran An, Santa Clara, CA (US); Xuesen Li, Santa Clara, CA (US)

(73) Assignees: Flexiv Ltd., Grand Cayman (KY); Shanghai Flexiv Robotics Technology Co, Ltd., Shanghai (CN)

( * ) Notice: Subject to any disclaimer, the term of this patent is extended or adjusted under 35 U.S.C. 154(b) by 193 days.

(21) Appl. No.: 17/311,618

(22) PCT Filed: Jul. 28, 2020

(86) PCT No.: PCT/CN2020/105012
§ 371 (c)(1),
(2) Date: Jun. 7, 2021

(87) PCT Pub. No.: WO2022/021038
PCT Pub. Date: Feb. 3, 2022

(65) Prior Publication Data
US 2022/0316968 A1    Oct. 6, 2022

(51) Int. Cl.
*G01L 5/00*         (2006.01)
*B25J 15/00*        (2006.01)
(Continued)

(52) U.S. Cl.
CPC .......... *G01L 5/0061* (2013.01); *B25J 15/0019* (2013.01); *B25J 19/02* (2013.01); *G01L 3/04* (2013.01); *G01L 5/16* (2013.01)

(58) Field of Classification Search
CPC ..... G01L 1/2231; G01L 5/226; G01L 5/0061; G01L 3/04; G01L 5/16; B25J 15/0019; B25J 19/02
See application file for complete search history.

(56) References Cited

U.S. PATENT DOCUMENTS

| | | | |
|---|---|---|---|
| 4,616,511 A | 10/1986 | Gindy et al. | |
| 10,239,213 B1 * | 3/2019 | Reich | B25J 9/1633 |

(Continued)

FOREIGN PATENT DOCUMENTS

| | | |
|---|---|---|
| CN | 101858801 A | 10/2010 |
| CN | 102435375 A | 5/2012 |

(Continued)

OTHER PUBLICATIONS

International Search Report and Written Opinion from International Application No. PCT/CN2020/105012 dated Apr. 26, 2021.
(Continued)

*Primary Examiner* — Octavia Davis Hollington
(74) *Attorney, Agent, or Firm* — Dorsey & Whitney LLP

(57) ABSTRACT

A multi-degree of freedom (DOF) force and torque sensor is provided. The multi-DOF force and torque sensor includes a first rigid plate, a second rigid plate, multiple elastic elements connected between the first and second rigid plates, and multiple signal pairs connected between the first and second rigid plates. The signal pairs are used for detecting relative displacements of the first and second rigid plates in multiple directions.

11 Claims, 4 Drawing Sheets

(51) Int. Cl.
  *B25J 19/02*  (2006.01)
  *G01L 3/04*   (2006.01)
  *G01L 5/16*   (2020.01)

(56) References Cited

U.S. PATENT DOCUMENTS

| | | |
|---|---|---|
| 10,260,970 B2   | 4/2019  | Lauzier et al. |
| 10,330,545 B2   | 6/2019  | Meyer et al. |
| 10,732,060 B2 * | 8/2020  | Strauss .................. G01L 5/009 |
| 11,287,340 B2 * | 3/2022  | Jiang .................... G01L 3/1435 |
| 2009/0007696 A1 | 1/2009  | Morimoto |
| 2019/0025143 A1 | 1/2019  | Doll |

FOREIGN PATENT DOCUMENTS

| | | | |
|---|---|---|---|
| CN | 103630285  A |   | 3/2014 |
| CN | 204495501  U |   | 7/2015 |
| CN | 107914265  A |   | 4/2018 |
| CN | 108444632  A |   | 8/2018 |
| KR | 20180003807 A | * | 1/2018 |
| WO | 2018004121 A1 |   | 1/2018 |

OTHER PUBLICATIONS

Extended European Search Report for European Application No. 20947454.3 dated Jul. 14, 2023.

* cited by examiner

MULTI-DEGREE OF FREEDOM FORCE AND TORQUE SENSOR AND ROBOT

TECHNICAL FIELD

The present application relates to the field of force and torque sensors, and more particularly to a multi-degree of freedom force and torque sensor and a robot.

BACKGROUND

Most of the existing force and torque sensors use contact-based strain gauges to convert strains of local structures caused by the global force and/or torque into electrical signals which will be amplified later. The strain gauges are usually bonded to such local structures, corresponding electrical signals are obtained when the strain gauges deform along with the local structures, and finally, forces and torques applied to the force and torque sensor are determined. For example, the Chinese patent application No. 201210589784.7 discloses such a six-dimension force and torque sensor with strain components bonded to mechanical structures. However, each strain gauge is only sensitive to a unique deformation patterns, but not sensitive to other deformations, which makes it is impossible for such strain gauge to be widely used in robots, automation industries, and laboratories.

Recently, there have been some products and researches focusing on non-contact sensing methods, such as capacitive, inductive, and optical solutions. For example, the Korean application KR10201130126082A and the U.S. Pat. No. 10,260,970B2 each disclose such kind of force and torque sensors. Unlike disposing the transducers (such as strain gauges) that convert deformations into electrical signals at local structures where violent deformations are most likely to happen, transducers in such solutions are disposed at positions with maximum displacements to sense displacements and convert the sensed displacements into electrical signals. In different application scenarios, different total ranges of three orthogonal forces and three orthogonal torques may be required, and thus the required mechanical structure needs to be designed to have the ability to balance these forces and torques. However, few existing technologies can prove that their designs have such abilities. In practice, the structural deformations caused by different forces and torques are seriously coupled, and thus it is difficult to adjust the detection ability of an individual force or torque of the sensor without affecting other force and torque detection ability.

Therefore, it is necessary to improve the six degree of freedom force and torque sensor.

SUMMARY

The following presents a simplified summary of one or more aspects of the present application in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the present application, a multi-degree of freedom (which herein may also be abbreviated as multi-DOF) force and torque sensor is provided. The multi-degree of freedom force and torque sensor may include a first rigid plate, a second rigid plate, a plurality of elastic elements connected between the first and second rigid plates, and a plurality of signal pairs arranged between the first and second rigid plates and configured to detect relative displacements of the first and second rigid plates in multiple directions. Each of the plurality of elastic elements may include a first pillar and a second pillar, in which a first end of the first pillar is connected to the first rigid plate and a first end of the second pillar is connected to the second rigid plate, and the first pillar and the second pillar each extend substantially in an axial direction of the multi-degree of freedom force and torque sensor. Each of the plurality of elastic elements may further include a connecting part connected to the first pillar and the second pillar. The connecting part is connected to a second end of the first pillar and a second end of the second pillar, and at least a portion of the connecting part extends substantially in a direction perpendicular to the axial direction of the multi-degree of freedom force and torque sensor.

According to another aspect of the present application, there provides a multi-degree of freedom force and torque sensor including: a first rigid plate, a second rigid plate, a plurality of elastic elements connected between the first and second rigid plates, a plurality of signal pairs arranged between the first and second rigid plates and configured to detect relative displacements of the first and second rigid plates in multiple directions, in which the plurality of elastic elements are arranged along edges of the first rigid plate and the second rigid plate. Each of the plurality of elastic elements may include a first pillar and a second pillar. A first end of the first pillar is connected to the first rigid plate, and a first end of the second pillar is connected to the second rigid plate. The first pillar and the second pillar each extend substantially in an axial direction of the multi-degree of freedom force and torque sensor. Each of the plurality of elastic elements may further include a connecting part configured to connect the first pillar and second pillar. The connecting part is shaped such that a first length of the connecting part is larger than a height of the connecting part in the axial direction of the multi-degree of freedom force and torque sensor. The first length is a length of a projection of the connecting part onto a plane perpendicular to the axial direction of the multi-degree of freedom force and torque sensor.

According to yet another aspect of the present application, a robot is provided. The robot includes multiple links and an end effector successively connected, where the end effector includes any one of the multi-degree of freedom force and torque sensors as described above.

BRIEF DESCRIPTION OF THE DRAWINGS

The application will be better understood by way of the following detailed description of embodiments of the application with reference to the appended drawings, in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1:
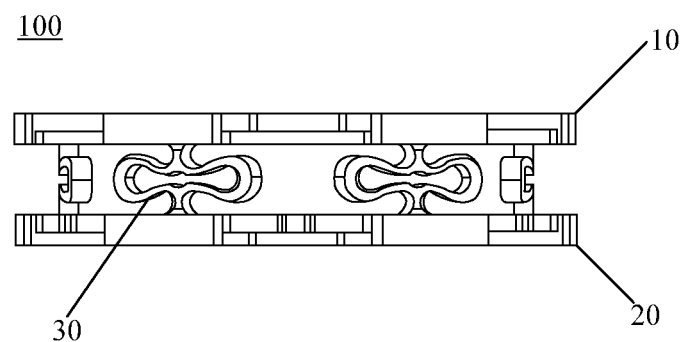
FIG. 1 is a schematic view of a multi-degree of freedom force and torque sensor according to an embodiment of the present application.

FIG. 1 is a schematic view of a multi-degree of freedom force and torque sensor 100 according to an embodiment of the present application. As shown, the multi-degree of freedom force and torque sensor 100 includes a first rigid plate 10, a second rigid plate 20, a plurality of elastic elements 30 and a plurality of signal pairs (now shown). The plurality of elastic elements 30 are arranged between the first and second rigid plates 10 and 20. In particular, each of the plurality of elastic elements 30 is connected to the first rigid plate 10, for example, via its one end and is connected to the second rigid plate 20, for example, via its another end. The plurality of signal pairs are arranged on the first and second rigid plates 10 and 20 to detect relative displacements of the two plates.

In one example, when an external force is applied to the multi-degree of freedom force and torque sensor 100, the first and second rigid plates 10 and 20 stay undeformed due to their rigidity. Meanwhile, deflection and deformation may occur to the elastic elements 30 in horizontal and/or vertical directions, which may result in relative displacements of the first rigid plate 10 and the second rigid plate 20. The elastic elements 30 are usually made of metallic materials such as stainless steel. However, other materials like plastic or rubber can also be used to form elastic elements 30 in some examples. The arranged signal pairs are capable of detecting the relative movements of the first rigid plate 10 and the second rigid plate 20.

Figure 2:
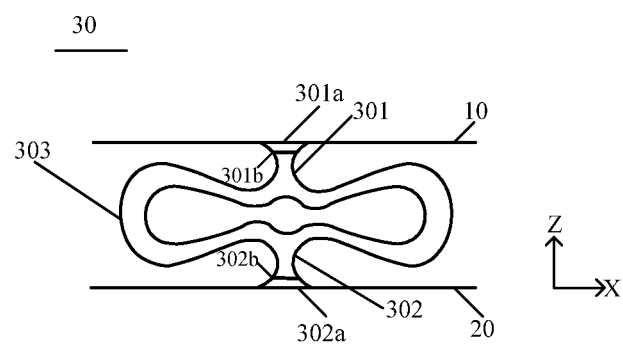
FIG. 2 is a schematic view of a cross section of an exemplary elastic element which can be applied to the multi-degree of freedom force and torque sensor shown in FIG. 1.

FIG. 2 is a schematic view of a cross section of an exemplary elastic element which can be applied to the multi-degree of freedom force and torque sensor 100 shown in FIG. 1. As shown in FIG. 2, the elastic element 30 includes a first pillar 301, a second pillar 302, and a connecting part 303. The first pillar 301 is connected to the first rigid plate 10 via its first end 301a. The second pillar 302 is connected to the second rigid plate 20 via its first end 302a. The first pillar 301 is connected to the connecting part 303 via its second end 301b, and the second pillar 302 is connected to the connecting part 303 via its second end 302b. As shown, the first pillar 301 and the second pillar 302 are configured to substantially extend in the axial direction of the multi-degree of freedom force and torque sensor 100. For the purpose of illustration, a coordinate system bonded to the sensor 100 with X, and Z axes is shown in FIG. 2, in which the Z axis is parallel to the axial direction of the multi-degree of freedom force and torque sensor 100, and Y axis (not shown) is perpendicular to the plane formed by X and Z axes. Hereinafter the X, Y, and Z axes are all also referred to as X, Y, and Z directions, and a plane perpendicular to Z axis is referred to as XY plane.

It should be understood that the expression "substantially extend in the axial direction of the multi-degree of freedom force and torque sensor 100" means the first pillar 301 and the second pillar 302 does not necessarily extend strictly in the axial direction of the multi-degree of freedom force and torque sensor 100, they can deviate from the axial direction to some extent. Also, the term "pillar" herein refers to a member disposed between the plates and the connecting part. By way of example and not limitation, the member can be in a pillar shape. Alternatively, the pillars 301 and 302 can be spiral-shaped and the other shape extending in the axial direction of the multi-degree of freedom force and torque sensor 100. According to the example, at least a portion of the connecting part 303 extends in a direction substantially perpendicular to the axial direction of the multi-degree of freedom force and torque sensor 100.

Figure 3:
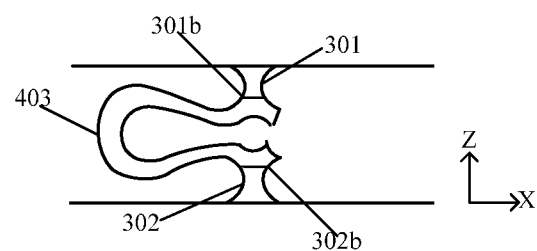
FIG. 3 schematically shows a view of a cross section of a connecting part that is of a semi-annular shape.

In some embodiments, the connecting part has an annular shape. The connecting part as shown in FIG. 2 is of an annular shape. As shown in FIG. 2, one side of an outer surface of the connecting part 303 is connected to the second end 301b of the first pillar 301, and another side of the outer surface of the connecting part 303 is connected to the second end 302b of the second pillar 302. FIG. 3 schematically shows a view of a cross section of a connecting part 403 that is of a semi-annular shape. As shown, one end of the semi-annular connecting part 403 is connected to the second end 301b of the first pillar 301, and another end of the connecting part 403 is connected to the second end 302b of the second pillar 302.

Figure 4:
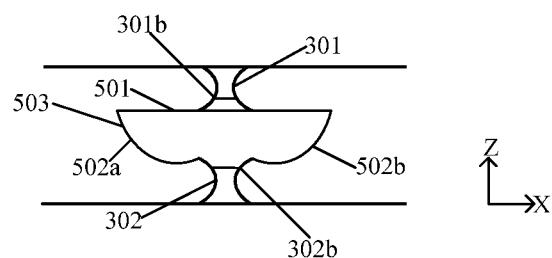
FIG. 4 schematically shows a schematic view of a cross section of a connecting part according to an example of the present application.
Figure 5:
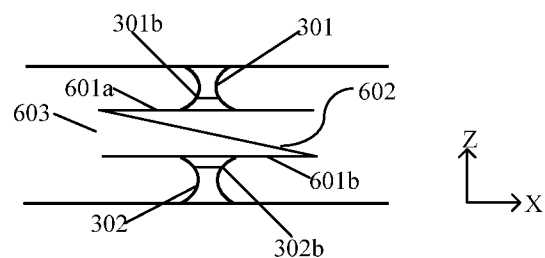
FIG. 5 schematically shows a schematic view of a cross section of a connecting part according to another example of the present application.

In some examples, the connecting part can include a first part and a second part, where the first part extends in a direction substantially perpendicular to the axial direction of the multi-degree of freedom force and torque sensor. FIG. 4 schematically shows a schematic view of a cross section of a connecting part 503 according to the example. As shown in FIG. 4, the first part 501 extends in the direction substantially perpendicular to the axial direction of the multi-degree of freedom force and torque sensor, namely, the first part 501 extends in the XY plane of the coordinate system as shown. The second parts 502a and 502b extend from the first part 501 to the second end 302b of the second pillar 302. For example, the second parts 502a and 502b extend from two different ends of the first part 501 to the second end 302b of the second pillar 302, respectively. The first pillar 301 is connected at the middle of the first part 501. FIG. 5 schematically shows a schematic view of a cross section of another connecting part 603 according to the example. As shown in FIG. 5, the first part includes a first sub-part 601a connected to the second end 301b of the first pillar 301 and a second sub-part 601b connected to the second end 302b of the second pillar 302. The first and second sub-parts 601a and 601b each extend in a direction substantially perpendicular to the axial direction of the multi-degree of freedom force and torque sensor 100, namely, they extend in the XY plane of the coordinate system as shown. The second part 602 is connected between the first sub-part 601a and the second sub-part 601b. In the example as shown in FIG. 5, the second part 602 is connected to an end of the first sub-part 601a and an end of the second sub-part 601b in which the two ends are in different extending directions of the two sub-parts. In practical use, the second part 602 can be connected to the first sub-part and second sub-part at other positions, and the second part 602 can be configured into any suitable shape as required.

Figure 6:
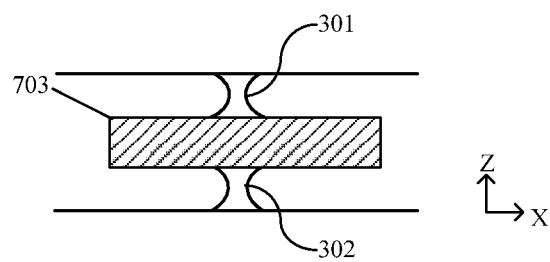
FIG. 6 schematically shows a schematic view of a cross section of a connecting part according to yet another example of the present application, where the connecting part is in a shape of a beam.

FIG. 6 schematically shows a schematic view of a cross section of a connecting part as an alternative example, where the connecting part is in a shape of a beam. As shown in FIG. 6, a connecting part 703 is a beam substantially perpendicular to the axial direction of the multi-degree of freedom force and torque sensor 100, namely, a beam arranged in the XY plane of the coordinate system as shown. One side of the connecting part 703 is connected to the first pillar 301, an opposite side of the connecting part 703 is connected to the second pillar 302.

It should be understood that the connecting parts shown in FIGS. 3, 4, 5, and 6 are merely used to schematically illustrate variations of the connecting part, which shall not be regarded as real shapes and scales of the connecting parts.

According to some examples of the present application, a plurality of elastic elements may be arranged and the edge portion of the first rigid plate 10 and the second rigid plate 20. In other embodiments according to the present application, the plurality of elastic elements can be arranged at positions near the center of the first and second rigid plates 10 and 20. The torque sensing ability of the multi-degree of freedom force and torque sensor 100 is weaker when the elastic elements are arranged near the center of the plates 10 and 20, and is stronger when the elastic elements are arranged at the edge portion of the plates 10 and 20. The force and torque sensing abilities of the sensor 100 can be adjusted into a proper ratio by adjusting radial positions of the elastic elements at the sensor 100.

Referring to FIG. 1, the plurality of elastic elements 30 can be arranged at an edge portion of the first rigid plate 10 and the second rigid plate 20 of the multi-degree of freedom force and torque sensor 100. Each of the plurality of elastic elements 30 includes the first pillar 301 and the second pillar 302 that substantially extend in the axial direction of the multi-degree of freedom force and torque sensor 100, and a connecting part 303 substantially extending in the direction perpendicular to the axial direction of the multi-degree of freedom force and torque sensor 100.

When a force is applied to the multi-degree of freedom force and torque sensor 100, the elastic elements 30 may deform in Z, X, or Y directions, referring to FIGS. 2-6. The deformations in X and Y directions causes the signal pairs arranged at the multi-degree of freedom force and torque sensor 100 to sense the force in the x and Y directions and a torque around the Z axis. The deformation in Z direction causes the signal pairs provided on the multi-degree of freedom force and torque sensor 100 to sense a torque around the X and Y axes and the force in the Z direction. If the multi-degree of freedom force and torque sensor 100 is required to have a sensing range for different forces and torques, the requirements can be achieved by adjusting heights in the Z axis, lengths in the XY plane of the two pillars and the connecting part.

Figure 7:
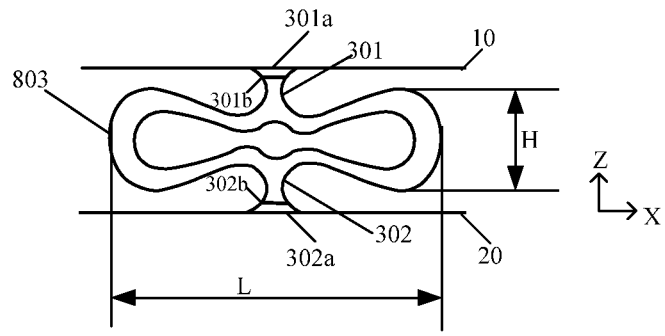
FIG. 7 is a schematic view of another elastic element that is applicable in the multi-degree of freedom force and torque sensor according to an embodiment of the present application.

According to some further embodiments, the connecting part is shaped such that a first length L of the connecting part is larger than a height H thereof in the axial direction of the multi-degree of freedom force and torque sensor, where the first length L is a length of a projection of the connecting part on a plane perpendicular to the axial direction of the multi-degree of freedom force and torque sensor. Referring to FIGS. 1 and 7, the multi-sensor force and torque sensor includes a first rigid plate 10, a second rigid plate 20, and a plurality of elastic elements 30 which are connected between the first and second rigid plates 10 and 20. Each of the plurality of elastic elements 30 includes a first pillar 301 and a second pillar 302. A first end 301a of the first pillar 301 is connected to the first rigid plate 10, and a first end 302a of the second pillar 302 is connected to the second rigid plate 20. The first pillar 301 and the second pillar 302 each are configured to extend substantially in the axial direction of the multi-degree of freedom force and torque sensor 100, namely, they extend in the XY plane of the coordinate system as shown. A connecting part 803 is connected to a second end 301b of the first pillar 301 and a second end 302b of the second pillar 302. According to this embodiment, the connecting part 803 is shaped such that a first length L of the connecting part 803 is larger than a height H thereof in the axial direction of the multi-degree of freedom force and torque sensor 100, where the first length L is a length of a projection of the connecting part 803 onto a plane (i.e., the XY plane of the coordinate system as shown in FIG. 7) perpendicular to the axial direction of the multi-degree of freedom force and torque sensor 100. A plurality of signal pairs (not shown) arranged between the first rigid plates 10 and second rigid plate 20 are configured to detect the relative displacements of the first rigid plate 10 and the second rigid plate 20 in multiple directions. According to the present application, the shapes described with reference to FIGS. 2 to 6 are also applicable to the multi-degree of freedom force and torque sensor described with reference to FIGS. 1 and 7, as long as the first length L can be ensured to be larger than the height H, and variants of the connecting part will not be further described herein.

Figure 8:
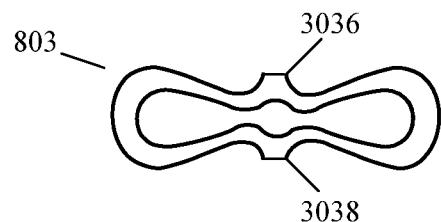
FIG. 8 schematically shows a view of a cross section of a connecting part 803 as shown in FIG. 7.

FIG. 8 schematically shows a view of a cross section of the connecting part 803 as shown in FIG. 7. As shown in FIG. 8, a contacting end 3036 is provided on one side of the outer surface of the connecting part 303, and another contacting end 3038 is provided on the other side of the outer surface of the connecting part 303. The second end 301b of the first pillar 301 is connected to the connecting part 303 via the contacting end 3036. The second end 302b of the second pillar 302 is connected the connecting part 303 via the contacting end 3038.

The connecting part 303 with a relatively longer first length L and a relatively shorter height H means that a large part of the connecting part 303 extends in the direction perpendicular to the axial direction of the multi-degree of freedom force and torque sensor 100, and a small part of the connecting part 303 extends in the axial direction of the multi-degree of freedom force and torque sensor 100. As such, the connecting part 303 contributes to deflections in the Z direction due to the beam-bending effects generated by its large part extending in the XY plane. The thinner and the longer the large part of the connecting part 303 is, the lower the stiffness in the Z direction the sensor will have. As shown in FIG. 7, for the deflection in the X direction, the connecting part 803 mainly rotates in the XY plane. The stiffness of a connection between the connecting part 803 and the pillars determines the resistance to the rotation. Specifically, for the deflection in Y direction, the connecting part may (i) twist around the X axis and (ii) bend around the Z axis. The connecting part of an annular shape as shown in FIG. 7 is taken as an example below. In this example, the annular connecting part includes the long annular portion, and the connecting part contributes to an easier beam-bending deflection in Y direction. The thicker the annular shape in the Z direction is and the thinner the annular shape in the y direction is (which means the annular shape is ribbon-like in the XZ plane), the easier a beam-bending deflection in the Y direction (which corresponds to the case (i) as described above) may occur. The thicker the annular shape in the Y direction is and the thinner the annular shape in the Z direction is (the annular shape is ribbon-like in the XY plane), the easier the connecting part deflects around the y direction in manner of twisting or buckling (which corresponds to the case (ii) as above).

Alternatively, in each of the examples, the elastic elements may be provided at the edge portion of the first rigid plate and the second rigid plate, which contributes to reduce the resistance of the sensor to torques and increase the sensing range for torques. Simply speaking, the position of the elastic elements may affect the rigidity and sensing range of the multi-degree of freedom force and torque sensor. When the elastic elements are provided toward the center position of the multi-degree of freedom force and torque sensor, the stiffness and sensing range in the Z axis are not affected, but the torque performance around the X axis and Y axis will be weakened due to the shorter torque arm. Such principle is also applied to the forces in the X and Y directions and the torque around the Z axis.

It can be understood that external forces and torques applied to the multi-degree of freedom force and torque sensor can be converted into local vertical forces and horizontal forces on the elastic elements. Accordingly, the shapes of the first pillar, the second pillar and the connecting part, as well as the interconnections between them can be tuned to accommodate for these local forces.

In each of the examples and embodiments, the signal pairs may be arranged between the first rigid plate 10 and the second rigid plate 20, and for example may be arranged parallel to the elastic elements 30. Each of the signal pairs includes a signal emitter and a signal receiver. As an example, if six signal channels are arranged, three of them may be configured to sense horizontal relative displacements of the elastic elements 30 and the other three of them may be configured to sense vertical relative displacements of the elastic elements 30. Accordingly, the force applied to the sensor in the X, Y, and Z directions and the torque around the X, Y, and Z axel of the sensor can be calculated from the sensed information. It should be understood that the way of mounting the signal pairs at the sensor can be determined by those skilled in the art based on the specific structure of the sensor, as long as the functions as discussed above can be implemented. The way and positions of mounting the signal pairs at the sensor are not limited to the disclosure herein.

Figure 9:
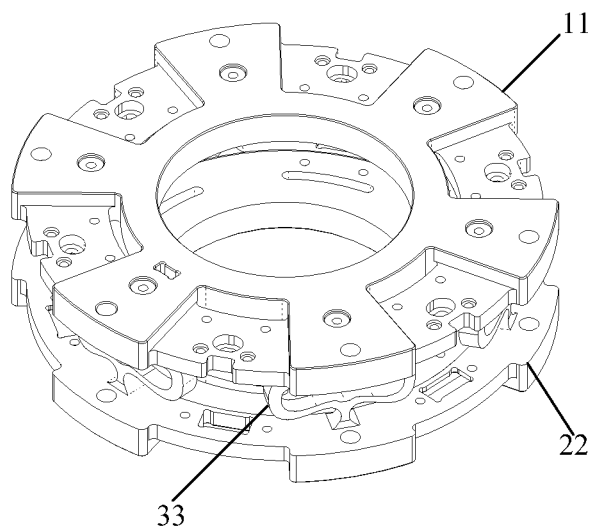
FIG. 9 is a perspective view of a multi-degree of freedom force and torque sensor 200 according to an embodiment of the present application.

FIG. 9 is a perspective view of a multi-degree of freedom force and torque sensor 200 according to an embodiment of the present application. As shown, the sensor 200 includes a first rigid plate 11, a second rigid plate 11, and six elastic elements 33. The six elastic elements 33 are located between the first rigid plate 11 and the second rigid plate 22. Particularly, the six elastic elements 33 are located at the periphery of the first rigid plate 11 and the second rigid plate 22, and the elastic elements 33 are each connected to the first rigid plate 11 and the second rigid plate 22. The elastic elements 33 can utilize the respective elastic elements as described above with reference to the drawings. The shape of the elastic elements will not be further described for conciseness. According to the example shown in FIG. 9, the signal pairs can be arranged between the first rigid plate 11 and the second rigid plate 22, in which a portion of the signal pairs can be used for sensing local horizontal displacements of the elastic elements 33, and the other portion of the signal pairs can be used for sensing local vertical displacements of the elastic elements 33. The number of the elastic elements 33 is not limited to six. In practice, more than six or less than six elastic elements can be used.

Figure 10:
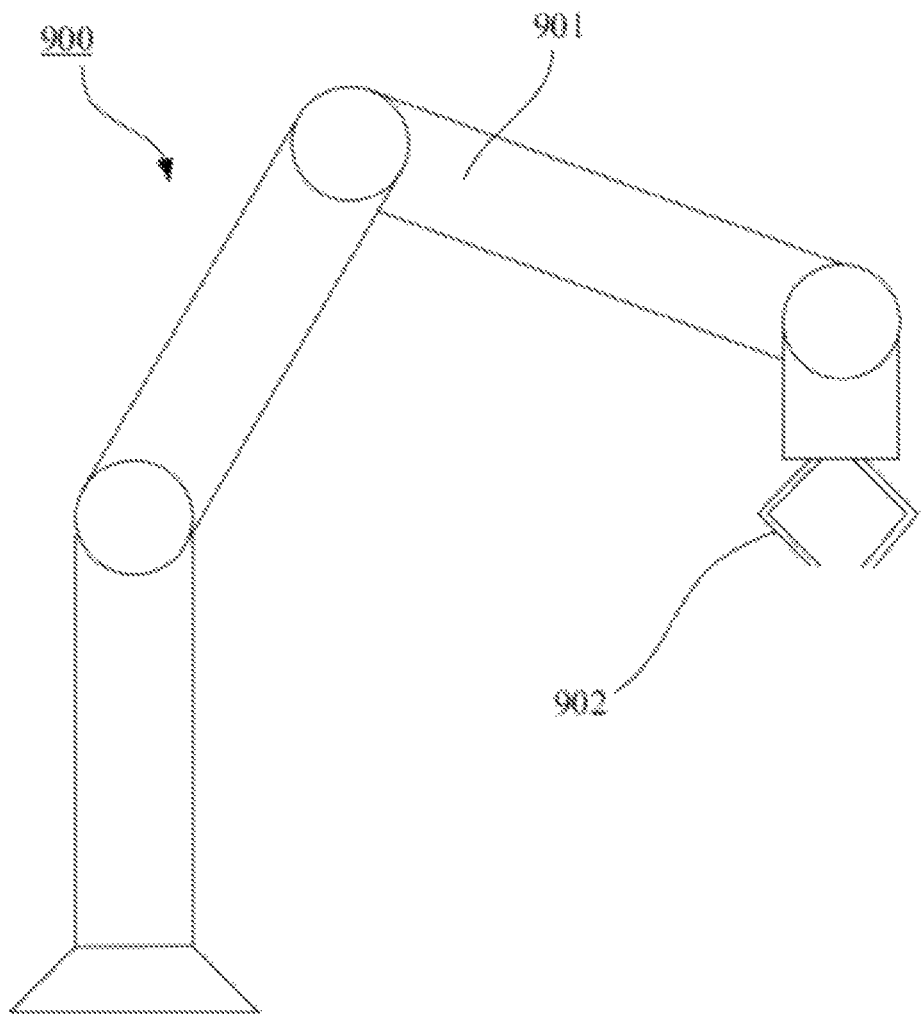
FIG. 10 illustrates an exemplary robot 900 including a multi-degree of freedom force and torque sensor according to an embodiment of the present application.

FIG. 10 illustrates an exemplary robot 900 including a multi-degree of freedom force and torque sensor according to an embodiment of the present application. As shown in FIG. 10, multiple links 901 and an end effector 902 are successively connected. The end effector 902 includes a multi-degree of freedom force and torque sensor, which is utilized to detect external force and torque applied to the end effector 902. Herein, the multi-degree of freedom force and torque sensor may adopt the multi-degree of freedom force and torque sensors as described above in conjunction with respective examples, such as the multi-degree of freedom force and torque sensors 100 or 200. It should be understood, in other embodiments, the multi-DOF force and torque sensor disclosed in above embodiments may also be installed in other components of the robot 900. For example, the multi-DOF force and torque sensor may be installed in joint actuators (not labeled) of the robot 900.

The embodiments as described above only illustrate several embodiments of the present application, and their descriptions are more specific and detailed, but they should not be construed as limiting the scope of the invention patent. It should be noted that, for those of ordinary skill in the art, without departing from the concept of the present application, several variants and modifications can be made, which all fall within the protection scope of the present application. Therefore, the protection scope of the invention patent shall be subject to the appended claims.

What is claimed:

1. A multi-degree of freedom force and torque sensor, comprising:
   a first rigid plate;
   a second rigid plate; and
   a plurality of elastic elements connected between the first and second rigid plates, each of the plurality of elastic elements including:
      a first pillar and a second pillar, a first end of the first pillar being connected to the first rigid plate and a first end of the second pillar being connected to the second rigid plate, the first pillar and the second pillar each extending in an axial direction of the multi-degree of freedom force and torque sensor; and
      a connecting part connected between the first pillar and second pillar, a first length of the connecting part being larger than a height of the connecting part in the axial direction of the multi-degree of freedom force and torque sensor when no load is applied onto the multi-degree of freedom force and torque sensor, the first length being a length of a projection of the connecting part onto a plane perpendicular to the axial direction of said multi-degree of freedom force and torque sensor; and
   a plurality of signal pairs arranged between the first and second rigid plates, and configured to detect relative displacements of the first and second rigid plates in multiple directions;
   wherein the plurality of elastic elements are arranged at edges of the first rigid plate and the second rigid plate; and
   wherein each of the plurality of signal pairs includes a signal emitter and a signal receiver.

2. The multi-degree of freedom force and torque sensor according to claim 1, wherein each of the plurality of the connecting parts is in a shape of a beam substantially perpendicular to the axial direction of the multi-degree of freedom force and torque sensor.

3. The multi-degree of freedom force and torque sensor according to claim 1, wherein the connecting part has an annular shape, in which a side of an outer surface of the connecting part is connected to a second end of the first pillar and an opposite side of the outer surface of the connecting part is connected to a second end of the second pillar.

4. The multi-degree of freedom force and torque sensor according to claim 3, wherein a contacting end is provided on the side of the outer surface of the connecting part and another contacting end is provided on the opposite side of the outer surface of the connecting part, such that the second end of the first pillar and the second end of the second pillar are connected to the contacting end and said another contacting end, respectively.

5. The multi-degree of freedom force and torque sensor according to claim 3, wherein at least one portion of the connecting part is higher than the second end of the first pillar in the axial direction of the multi-degree of freedom force and torque sensor, and/or at least one portion of the connecting part is lower than the second end of the second pillar in the axial direction of the multi-degree of freedom force and torque sensor.

6. The multi-degree of freedom force and torque sensor according to claim 1, the connecting part extends substantially in a circumferential direction of the multi-degree of freedom force and torque sensor.

7. A robot comprising multiple links and an end effector successively connected, wherein the end effector comprises a multi-degree of freedom force and torque sensor, the multi-degree of freedom force and torque sensor comprising:
- a first rigid plate;
- a second rigid plate;
- a plurality of elastic elements connected between the first and second rigid plates, each of the plurality of elastic elements including:
  - a first pillar and a second pillar, a first end of the first pillar being connected to the first rigid plate and a first end of the second pillar being connected to the second rigid plate, the first pillar and the second pillar extending substantially in an axial direction of the multi-degree of freedom force and torque sensor; and
  - a connecting part configured to connect the first pillar and the second pillar, a first length of the connecting part being larger than a height of the connecting part in the axial direction of the multi-degree of freedom force and torque sensor, the first length being a length of a projection of the connecting part onto a plane perpendicular to the axial direction of said multi-degree of freedom force and torque sensor; and
- a plurality of signal pairs arranged between the first and second rigid plates, configured to detect relative displacements of the first and second rigid plates in multiple directions, wherein each of the plurality of signal pairs includes a signal emitter and a signal receiver.

8. The robot according to claim 7, wherein the connecting part has an annular shape, a side of an outer surface of the connecting part is connected to a second end of the first pillar, and an opposite side of the outer surface of the connecting part is connected to a second end of the second pillar.

9. The multi-degree of freedom force and torque sensor according to claim 7, wherein the connecting part is in a shape of a beam substantially perpendicular to the axial direction of the multi-degree of freedom force and torque sensor.

10. The robot according to claim 7, wherein the connecting part is shaped such that a first length of the connecting part is larger than a height thereof in the axial direction of the multi-degree of freedom force and torque sensor, in which the first length is a length of a projection of the connecting part onto a plane perpendicular to the axial direction of said multi-degree of freedom force and torque sensor.

11. The robot according to claim 7, wherein the plurality of elastic elements are arranged at an edge portion of the first rigid plate and the second rigid plate.

* * * * *